United States Patent
Shin et al.

(10) Patent No.: US 6,850,644 B1
(45) Date of Patent: Feb. 1, 2005

(54) METHOD FOR ANALYZING TEXTURE OF DIGITAL IMAGE

(75) Inventors: Hyun-doo Shin, Sungnam (KR); Yang-lim Choi, Suwon (KR); B. S. Manjunath, Santa Barbara, CA (US)

(73) Assignees: Samsung Electronics Co., Ltd., Kyungki-Do (KR); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/676,095

(22) Filed: Oct. 2, 2000

Related U.S. Application Data

(60) Provisional application No. 60/157,077, filed on Oct. 1, 1999.

(51) Int. Cl.$^7$ ................................................ G06T 9/40
(52) U.S. Cl. ..................................................... 382/190
(58) Field of Search ................................ 382/190, 108, 382/209, 217, 218, 219; 345/582

(56) References Cited

U.S. PATENT DOCUMENTS

| | | | |
|---|---|---|---|
| 6,192,150 B1 * | 2/2001 | Leow et al. | 382/190 |
| 6,424,741 B1 * | 7/2002 | Shin et al. | 382/170 |

FOREIGN PATENT DOCUMENTS

| | | |
|---|---|---|
| JP | 63-262778 | 10/1988 |
| JP | 7-220026 | 8/1995 |
| JP | 9-274661 | 10/1997 |
| JP | 10-97627 | 4/1998 |

OTHER PUBLICATIONS

Manjunath et al. "Texture Features for Browsing and Retrieval of Image Data." IEEE Trans. on Pattern Analysis and Machine Intelligence, vol. 18, No. 8, Aug. 1996, pp. 837–842.*

Teuner et al. "Orientation– and Scale–Invariant Recognition of Textures in Multi–Object Scenes." Proc. Int. Conf. on Image Processing, vol. 3, Oct. 26, 1997, pp. 174–177.*

Zhang et al. "Texture Image Segmentation Method Based on Wavelet Transform and Neural Networks." IEEE Int. Conf. on Systems, Man and Cybernetics, vol. 5, Oct. 11, 1998, pp. 4595–4600.*

Ravizza et al. "Myocardial Tissue Characterization by Means of Nuclear Magnetic Resonance Imaging." Proc. Computers in Cardiology, Sep. 23, 1991, pp. 501–504.*

Augusteijn et al. "A Performance Evaluation of Texture Measures for Image Classification and Segmentation Using the Cascade–Correlation Architecture." IEEE Int. Conf. on Neural Networks, vol. 7, Jun. 27, 1994, pp. 4300–4305.*

(List continued on next page.)

Primary Examiner—Jon Chang
(74) Attorney, Agent, or Firm—Sughrue Mion, PLLC

(57) ABSTRACT

A digital image texture analyzing method including the steps of (a) obtaining the mean ($\mu_0$) and variance ($\sigma_0$) of the pixel values of an original image, and (b) obtaining m×n filtered images by filtering the original image using predetermined filters, each having a unique combination of one of m scales and one of n orientations, where m and n are predetermined positive integers, (c) calculating the means ($\mu_{11}, \mu_{21}, \ldots, \mu_{mn}$) and variances ($\sigma_{11}, \sigma_{21}, \ldots, \sigma_{mn}$) of the respective filtered images, and (d) obtaining a texture descriptor having the mean ($\mu_0$) and variance ($\sigma_0$) of the pixel values of the original image obtained in the step (a), and the means ($\mu_{11}, \mu_{21}, \ldots, \mu_{mn}$) and variances ($\sigma_{11}, \sigma_{21}, \ldots, \sigma_{mn}$) of the respective filtered images obtained in the step (c), as texture features. The texture analyzing method allows image textures to be more accurately analyzed and compared. Also, according to the digital image texture analyzing method, when an image is only rotated, enlarged or reduced relative to another image, the similarity of the textures of two images are analyzed, that is, accurate analysis can be performed.

37 Claims, 5 Drawing Sheets

OTHER PUBLICATIONS

Lam et al. "Classification of Rotated and Scaled Textures by Local Linear Operators." IEEE Int. Symp. on Circuits and Systems, vol. 1, Apr. 30, 1995, pp. 243–246.*

Ma et al. "A Comparison of Wavelet Transform Features for Texture Image Annotation." Proc. Int. Conf. on Image Processing, vol. 2, Oct. 23, 1995.*

Puzicha J et al. "Non–parametric Similarity Measures for Unsupervised Texture Segmentation and Image Retrieval" Computer Vision and Pattern Recognition Jun. 17, 1997, pp. 267–272.

Chung–Sheng Li et al. "Deriving Texture Feature Set for Content–Based Retrieval of Satellite Image Database" Image Processing, Oct. 26, 1997, pp. 576–579.

Wu P et al "A Texture Descriptor for Image Retrieval and Browsing" Content–Based Access of Image and Video Libraries Jun. 22, 1999 pp. 3–7.

IEEE Transactions on Pattern Analysis and Machine Intelligence; vol. 18, No. 8; Aug. 1996.

* cited by examiner

METHOD FOR ANALYZING TEXTURE OF DIGITAL IMAGE

This application claims the priority benefit of provisional application Ser. No. 60/157,077, entitled "METHOD FOR ANALYZING OF STILL IMAGE TEXTURE", filed on Oct. 1, 1999.

BACKGROUND OF THE INVENTION

1. Field of the Invention

The present invention relates to a method for analyzing of the texture of a digital image, and more particularly to a method for analyzing the texture of a digital image using a texture descriptor.

2. Description of the Related Art

FIG. 1 illustrates a conventional digital image texture analyzing method. Referring to FIG. 1, filtered images are obtained by performing a predetermined filtering method (step 102), and the mean values and variances of the pixel values of the filtered images are used as texture descriptors of the images (steps 104 and 106). The texture descriptors indicate an analysis result of image texture.

However, according to the conventional digital image texture analyzing method, even when the textures of an image are similar to those of another image, in the case where one image is rotated, enlarged or reduced relative to the other image, the textures of the two images are analyzed to be different.

SUMMARY OF THE INVENTION

It is a first object of the present invention to provide a digital image texture analyzing method for analyzing and comparing textures of images more accurately.

It is a second object of the present invention to provide a computer-readable recording medium for storing program codes for performing the digital image texture analyzing method for accomplishing the first object of the present invention.

It is a third object of the present invention to provide a digital image texture analyzing apparatus for performing the digital image texture analyzing method for accomplishing the first object of the present invention.

It is a fourth object of the present invention to provide a digital image searching method for searching for an image using a texture descriptor indexed by the digital image texture analyzing method for accomplishing the first object of the present invention.

It is a fifth object of the present invention to provide a digital image texture analyzing method for accurately analyzing the similarity of textures of two images.

It is a sixth object of the present invention to provide a computer-readable recording medium for storing program codes for performing the digital image texture analyzing method for accomplishing the fifth object of the present invention.

It is a seventh object of the present invention to provide a digital image texture analyzing apparatus for performing the digital image texture analyzing method for accomplishing the fifth object of the present invention.

It is an eighth object of the present invention to provide a digital image texture analyzing method for accurately analyzing that textures of two images are similar even when one image is rotated relative to the other image.

It is a ninth object of the present invention to provide a computer-readable recording medium for storing program codes for performing the digital image texture analyzing method for accomplishing the eighth object of the present invention.

It is a tenth object of the present invention to provide a digital image texture analyzing apparatus for performing the digital image texture analyzing method for accomplishing the eighth object of the present invention.

It is an eleventh object of the present invention to provide a digital image texture analyzing method for accurately analyzing that textures of two images are similar even when one image is enlarged or reduced relative to the other image.

It is a twelfth object of the present invention to provide a computer-readable recording medium for storing program codes for performing the digital image texture analyzing method for accomplishing the eleventh object of the present invention.

It is a thirteenth object of the present invention to provide a digital image texture analyzing apparatus for performing the digital image texture analyzing method for accomplishing the eleventh object of the present invention.

It is a fourteenth object of the present invention to provide a digital image texture analyzing method for accurately analyzing that textures of two images are similar even when one image is rotated, enlarged or reduced relative to the other image.

Accordingly, to achieve the first object, there is provided a digital image texture analyzing method including the step of obtaining a texture descriptor including the mean of the pixel values of an original image as a texture feature.

Here, the texture feature may further include the variance of the pixel values of the original image.

Also, the digital image texture analyzing method may include the step of obtaining a texture descriptor including the variance of the pixel values of an original image as a texture feature.

According to another aspect of the invention, there is provided a digital image texture analyzing method including the steps of (a) obtaining the mean ($\mu_0$) and variance ($\sigma_0$) of the pixel values of an original image, (b) obtaining m×n filtered images by filtering the original image using predetermined filters, each having a unique combination of one of m scales and one of n orientations, where m and n are predetermined positive integers, (c) calculating the means ($\mu_{11}, \mu_{21}, \ldots, \mu_{mn}$) and variances ($\sigma_{11}, \sigma_{21}, \ldots, \sigma_{mn}$) of the respective filtered images, and (d) obtaining a texture descriptor having the mean ($\mu_0$) and variance ($\sigma_0$) of the pixel values of the original image obtained in the step (a), and the means ($\mu_{11}, \mu_{21}, \ldots, \mu_{mn}$) and variances ($\sigma_{11}, \sigma_{21}, \ldots, \sigma_{mn}$) of the respective filtered images obtained in the step (c), as texture features.

To achieve the second object of the present invention, there is provided a computer-readable recording medium for storing program codes for performing a digital image texture analyzing method including the steps of (a) obtaining the mean ($\mu_0$) and variance ($\sigma_0$) of the pixel values of an original image, (b) obtaining m×n filtered images by filtering the original image using predetermined filters, each having a unique combination of one of m scales and one of n orientations, where m and n are predetermined positive integers, (c) calculating the means ($\mu_{11}, \mu_{21}, \ldots, \mu_{mn}$) and variances ($\sigma_{11}, \sigma_{21}, \ldots, \sigma_{mn}$) of the respective filtered images, and (d) obtaining a texture descriptor having the mean ($\mu_0$) and variance ($\sigma_0$) of the pixel values of the original image obtained in the step (a), and the means ($\mu_{11}, \mu_{21}, \ldots, \mu_{mn}$) and variances ($\sigma_{11}, \sigma_{21}, \ldots, \sigma_{mn}$) of the respective filtered images, obtained in the step (c), as texture features.

To achieve the third object of the present invention, there is provided a digital image texture analyzing apparatus including a mean/variance calculating unit for calculating the mean and variance of the pixel values of an original image, and a texture descriptor setting unit for setting the mean and variance as texture descriptors.

Also, the apparatus may further include a filtering unit for filtering the original image using predetermined filters, each having a unique combination of one of m scales and one of n orientations, where m and n are predetermined positive integers, to obtain m×n filtered images, wherein the mean/variance calculating unit obtains the mean ($\mu_0$) and variance ($\sigma_0$) of the pixel values of the original image and the means ($\mu_{11}, \mu_{21}, \ldots, \mu_{mn}$) and variances ($\sigma_{11}, \sigma_{21}, \ldots, \sigma_{mn}$) of the respective filtered images, and wherein the texture descriptor setting unit obtains a texture descriptor having the mean ($\mu_0$) and variance ($\sigma_0$) of the pixel values of the original image, and the means ($\mu_{11}, \mu_{21}, \ldots, \mu_{mn}$) and variances ($\sigma_{11}, \sigma_{21}, \ldots, \sigma_{mn}$) of the respective filtered images, as texture features.

To achieve the fourth object of the present invention, there is provided a digital image searching method including the step of searching for an image having a similar texture descriptor to a query image using a texture descriptor having the mean and variance of the pixel values of an original image as texture features.

To achieve the fifth object of the present invention, there is provided a digital image texture analyzing method for evaluating the similarity of textures of two arbitrary digital images by obtaining a matching metric between the two images, the method including the step of calculating the matching metric including absolute differences between the means of the pixel values of the two arbitrary digital images.

Also, the matching metric may further include absolute differences between the variances of the pixel values of the original image.

According to another aspect of the present invention, there is provided a digital image texture analyzing method for evaluating the similarity of textures of two arbitrary digital images by obtaining a matching metric between the two images, the method including the step of calculating the matching metric including absolute differences between the variances of the pixel values of the two arbitrary digital images.

Alternatively, the digital image texture analyzing method may include the steps of (a) obtaining m×n filtered images with respect to two arbitrary images using predetermined filters, each having a unique combination of one of m scales and one of n orientations, where m and n are predetermined positive integers, and (b) calculating the matching metric defined by:

$$d(i, j) = \sum_{m,n} d_{m,n}(i, j) + b$$

with respect to the original image and the m×n filtered images, where the mean and variance of the pixel values of the respective images are $\mu$ and $\sigma$, the mean and variance of the pixel values of the original image are $\mu_0$ and $\sigma_0$.

$$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

$$d_{m,n}(i, j) = \left| \frac{\mu_{m,n}^{(i)} - \mu_{m,n}^{(j)} j}{\alpha(\mu_{m,n})} \right| + \left| \frac{\sigma_{m,n}^{(i)} - \sigma_{m,n}^{(j)}}{\alpha(\sigma_{m,n})} \right|,$$

and $\alpha(\ )$ is a predetermined scaling function.

To achieve the sixth object of the present invention, there is provided a computer-readable recording medium for storing program codes for performing a digital image texture analyzing method for evaluating the similarity of textures of two arbitrary digital images by obtaining a matching metric between the two images, the method including the steps of (a) obtaining m×n filtered images with respect to two arbitrary images using predetermined filters, each having a unique combination of one of m scales and one of n orientations, where m and n are predetermined positive integers, and (b) calculating the matching metric defined by:

$$d(i, j) = \sum_{m,n} d_{m,n}(i, j) + b$$

with respect to the original image and the m×n filtered images, where the mean and variance of the pixel values of the respective images are $\mu$ and $\sigma$, the mean and variance of the pixel values of the original image are $\mu_0$ and $\sigma_0$.

$$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

$$d_{m,n}(i, j) = \left| \frac{\mu_{m,n}^{(i)} - \mu_{m,n}^{(j)} j}{\alpha(\mu_{m,n})} \right| + \left| \frac{\sigma_{m,n}^{(i)} - \sigma_{m,n}^{(j)}}{\alpha(\sigma_{m,n})} \right|,$$

and $\alpha(\ )$ is a predetermined scaling function.

To achieve the seventh object of the present invention, there is provided a digital image texture analyzing apparatus for evaluating the similarity of textures of two arbitrary digital images by obtaining a matching metric between the two images, the apparatus including a filtering unit for obtaining m×n filtered images with respect to two arbitrary images using predetermined filters, each having a unique combination of one of m scales and one of n orientations, where m and n are predetermined positive integers, and a matching metric calculating unit for calculating the matching metric defined by:

$$d(i, j) = \sum_{m,n} d_{m,n}(i, j) + b$$

with respect to the original image and the m×n filtered images, where the mean and variance of the pixel values of the respective images are $\mu$ and $\sigma$, the mean and variance of the pixel values of the original image are $\mu_0$ and $\sigma_0$, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

$$d_{m,n}(i, j) = \left| \frac{\mu_{m,n}^{(i)} - \mu_{m,n}^{(j)} j}{\alpha(\mu_{m,n})} \right| + \left| \frac{\sigma_{m,n}^{(i)} - \sigma_{m,n}^{(j)}}{\alpha(\sigma_{m,n})} \right|,$$

and $\alpha(\ )$ is a predetermined scaling function.

To achieve the eighth object of the present invention, there is provided a digital image texture analyzing method for evaluating the similarity of textures of two arbitrary digital images by obtaining a matching metric between the two images, the method including the steps of (a) obtaining filtered images using predetermined filters having different orientation coefficients with respect to two arbitrary images, and (b) obtaining a matching metric by calculating the minimum value of the sum of absolute differences between the means of the pixel values with respect to an arbitrary filtered image and images filtered by filters having orientation coefficients different from those of filters used for filtering the arbitrary image.

According to another aspect of the present invention, there is provided a digital image texture analyzing method for evaluating the similarity of textures of two arbitrary digital images by obtaining a matching metric between the two images, the method including the steps of (a) obtaining filtered images using predetermined filters having different orientation coefficients with respect to two arbitrary images, and (b) obtaining a matching metric by calculating the minimum value of the sum of absolute differences between the variances of the pixel values with respect to an arbitrary filtered image and images filtered by filters having orientation coefficients different from those of filters used for filtering the arbitrary image.

To achieve the ninth object of the present invention, there is provided a computer-readable recording medium for storing program codes for performing a digital image texture analyzing method for evaluating the similarity of textures of two arbitrary digital images by obtaining a matching metric between the two images, the method including the steps of (a) obtaining m×n filtered images with respect to two arbitrary images using predetermined filters, each having a unique combination of one of m scales and one of n orientations, where m and n are predetermined positive integers, and (b) calculating the matching metric defined by:

$$d_{m,n}(i,j) = \min_{l \le i \le K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right]$$

with respect to the m×n filtered images, where the mean and variance of the pixel values of the respective images are $\mu$ and $\sigma$, K is a predetermined positive integer representing the number of orientations to be considered, $\oplus$ denotes a modulo shift function, and $\alpha(\ )$ is a predetermined scaling function.

To achieve the tenth object of the present invention, there is provided a digital image texture analyzing apparatus for evaluating the similarity of textures of two arbitrary digital images by obtaining a matching metric between the two images, the apparatus including a filtering unit for obtaining m×n filtered images with respect to two arbitrary images by filtering the original image using predetermined filters, each having a unique combination of one of m scales and one of n orientations, where m and n are predetermined positive integers, and a matching metric calculating unit for calculating the matching metric defined by:

$$d_{m,n}(i,j) =$$

$$\min_{l \le i \le K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right] + b$$

with respect to the m×n filtered images, where the mean and variance of the pixel values of the respective images are $\mu$ and $\sigma$, the mean and variance of the pixel values of the original image are $\mu_0$, and $\sigma_0$, K is a predetermined positive integer representing the number of orientations to be considered $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

$\oplus$ denotes a modulo shift function, and $\alpha(\ )$ is a predetermined scaling function.

To achieve the eleventh object of the present invention, there is provided a digital image texture analyzing method for evaluating the similarity of textures of two arbitrary digital images by obtaining a matching metric between the two images, the method including the steps of (a) obtaining filtered images using predetermined filters having different scale coefficients with respect to two arbitrary images, and (b) obtaining a matching metric by calculating the minimum value of the sum of absolute differences between the means of the pixel values with respect to an arbitrary filtered image and images filtered by filters having scale coefficients different from those of filters used for filtering the arbitrary image.

According to another aspect of the present invention, there is provided a digital image texture analyzing method for evaluating the similarity of textures of two arbitrary digital images by obtaining a matching metric between the two images, the method including the steps of (a) obtaining filtered images using predetermined filters having different scale coefficients with respect to two arbitrary images, and (b) obtaining a matching metric by calculating the minimum value of the sum of absolute differences between the variances of the pixel values with respect to an arbitrary filtered image and images filtered by filters having scale coefficients different from those of filters used for filtering the arbitrary image.

To achieve the twelfth object of the present invention, there is provided a computer-readable recording medium for storing program codes for performing a digital image texture analyzing method for evaluating the similarity of textures of two arbitrary digital images by obtaining a matching metric between the two images, the method including the steps of (a) obtaining m×n filtered images with respect to two arbitrary images by filtering the original image using predetermined filters, each having a unique combination of one of m scales and one of n orientations, where m and n are predetermined positive integers, and (b) calculating the matching metric defined by:

$$d(i,j) =$$

$$\min_{\substack{p=0,1\\q=0,1}} \left[ \sum_{m} \sum_{n}^{S-1} \left| \frac{\mu_{m+p,n}^{i}}{\alpha(\mu_{m+p,n})} - \frac{\mu_{m+q,n}^{j}}{\alpha(\mu_{m+q,n})} \right| + \left| \frac{\sigma_{m+p,n}^{i}}{\alpha(\sigma_{m+p,n})} - \frac{\sigma_{m+q,n}^{j}}{\alpha(\sigma_{m+q,n})} \right| \right]$$

with respect to the original image and the m×n filtered images, where the mean and variance of the pixel values of the respective images are $\mu$ and $\sigma$, S is a predetermined positive integer representing the number of scale coefficients to be considered, and $\alpha(\ )$ is a predetermined scaling function.

To achieve the thirteenth object of the present invention, there is provided a digital image texture analyzing apparatus for evaluating the similarity of textures of two arbitrary digital images by obtaining a matching metric between the two images, the apparatus including a filtering unit for obtaining m×n filtered images with respect to two arbitrary images by filtering the original image using predetermined filters, each having a unique combination of one of m scales and one of n orientations, where m and n are predetermined positive integers, and a matching metric calculating unit for calculating the matching metric defined by:

$$d(i, j) = \min_{\substack{p=0,1 \\ q=0,1}} \left[ \sum_m^{S-1} \sum_n \left| \frac{\mu_{m+p,n}^i}{\alpha(\mu_{m+p,n})} - \frac{\mu_{m+q,n}^j}{\alpha(\mu_{m+q,n})} \right| + \left| \frac{\sigma_{m+p,n}^i}{\alpha(\sigma_{m+p,n})} - \frac{\sigma_{m+q,n}^j}{\alpha(\sigma_{m+q,n})} \right| \right]$$

with respect to the original image and the m×n filtered images, where the mean and variance of the pixel values of the respective images are $\mu$ and $\sigma$, S is a predetermined positive integer representing the number of scale coefficients to be considered, and $\alpha(\ )$ is a predetermined scaling function.

To achieve the fourteenth object of the present invention, there is provided a digital image texture analyzing method for evaluating the similarity of textures of two arbitrary digital images by obtaining a matching metric between the two images, the method including the steps of (a) obtaining filtered images using predetermined filters having different orientation and scale coefficients with respect to two arbitrary images, and (b) obtaining a matching metric by calculating the minimum value of the sum of absolute differences between the variances and means of the pixel values with respect to an arbitrary filtered image and images filtered by filters having scale and orientation coefficients different from those of filters used for filtering the arbitrary image.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Preferred embodiments of the present invention will now be described in detail with reference to the accompanying drawings.

Figure 1:
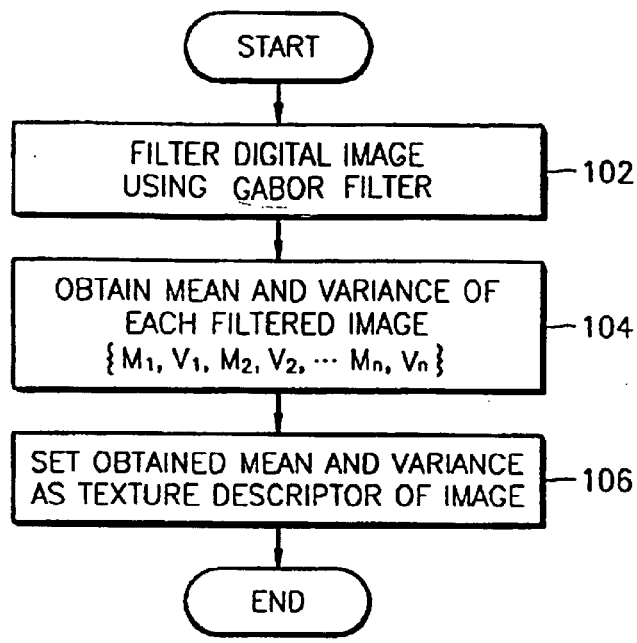
FIG. 1 illustrates a conventional digital image texture analyzing method.
Figure 2:
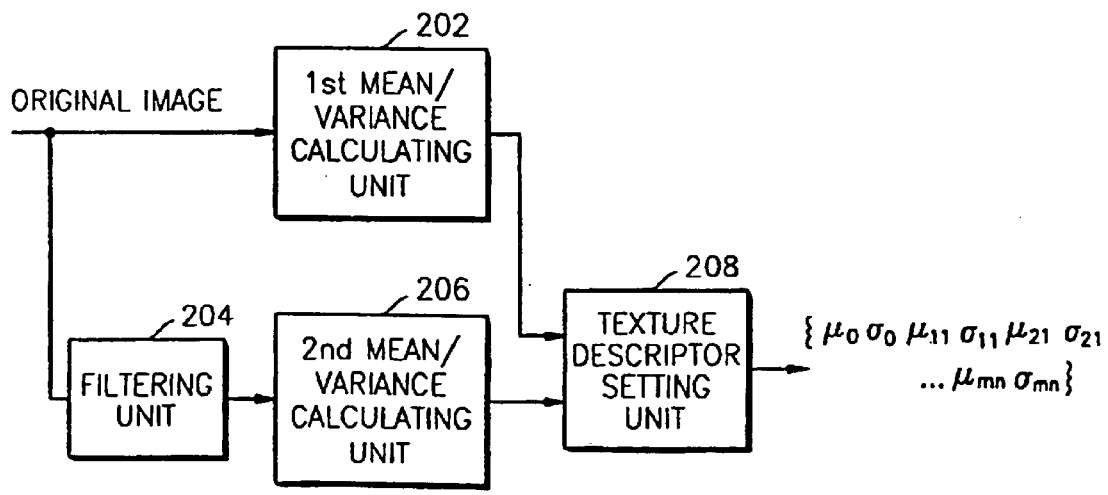
FIG. 2 is block diagram illustrating a digital image texture analyzing apparatus according to an embodiment of the present invention.
Figure 3:
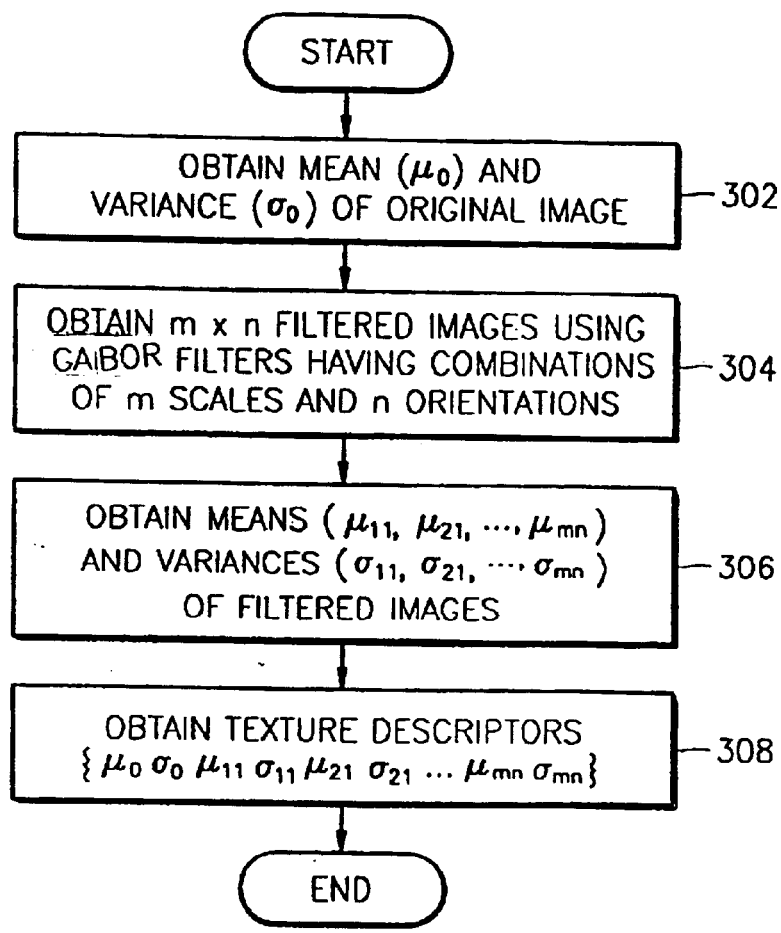
FIG. 3 is a flow chart illustrating major steps of a digital image texture analyzing method according to an embodiment of the present invention.

FIG. 2 is block diagram illustrating a digital image texture analyzing apparatus according to an embodiment of the present invention, and FIG. 3 is a flow chart illustrating major steps of a digital image texture analyzing method according to an embodiment of the present invention. FIG. 3 will be occasionally referred to below.

First, referring to FIG. 2, the digital image texture analyzing apparatus according to an embodiment of the present invention includes a first mean/variance calculating unit 202, a filtering unit 204, a second mean/variance calculating unit 206 and a texture descriptor setting unit 208.

The operation of the digital image texture analyzing apparatus will now be described.

The first mean/variance calculating unit 202 calculates the mean and variance of the pixel values of an original image, $\mu_0$ and $\sigma_0$. (step 302). Next, the filtering unit 204 obtains m×n filtered images using Gabor filters, each having a unique combination of one of m scales and one of n orientations (m and n are predetermined positive integers) (step 304). Then, the second mean/variance calculating unit 206 calculates the means and variances of the respective filtered images $\mu_{11}, \sigma_{11}, \mu_{21}, \ldots, \mu_{mn}, \sigma_{mn}$ (step 306).

Now, the texture descriptor setting unit 208 obtains a texture descriptor in the form of $\{\mu_0\ \sigma_0\ \mu_{11}\sigma_{11}\mu_{21}\sigma_{21}, \ldots, \mu_{mn}\sigma_{mn}\}$, containing the mean and variance of the pixel values of the original image obtained in the step 302, $\mu_0$ and $\sigma_0$, and the means and variances of the respective filtered images $\mu_{11}, \sigma_{11}, \mu_{21}, \sigma_{21}, \ldots, \mu_{mn}, \sigma_{mn}$ obtained in the step 306 (step 308).

The texture descriptor is used in indexing images. The indexed images form an image database. If the image database is formed, of the two indexed images, an a image having a texture descriptor similar to a texture descriptor of a query image can be searched for. In particular, in order to search for an image similar to a query image using a texture descriptor having the mean and variance of the pixel values of an original image as texture features based on the analyzing method of the present invention, simulation was performed. The simulation result showed that the searching efficiency was improved.

Figure 4:
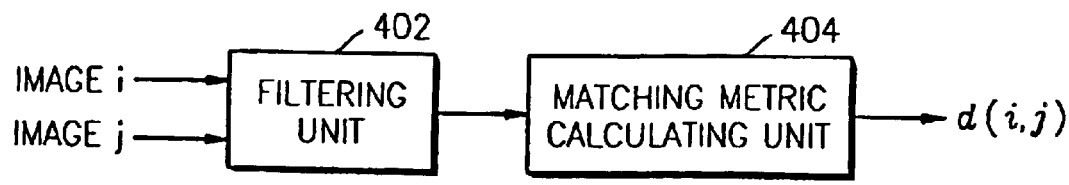
FIG. 4 is block diagram illustrating a digital image texture analyzing apparatus according to another embodiment of the present invention.
Figure 5:
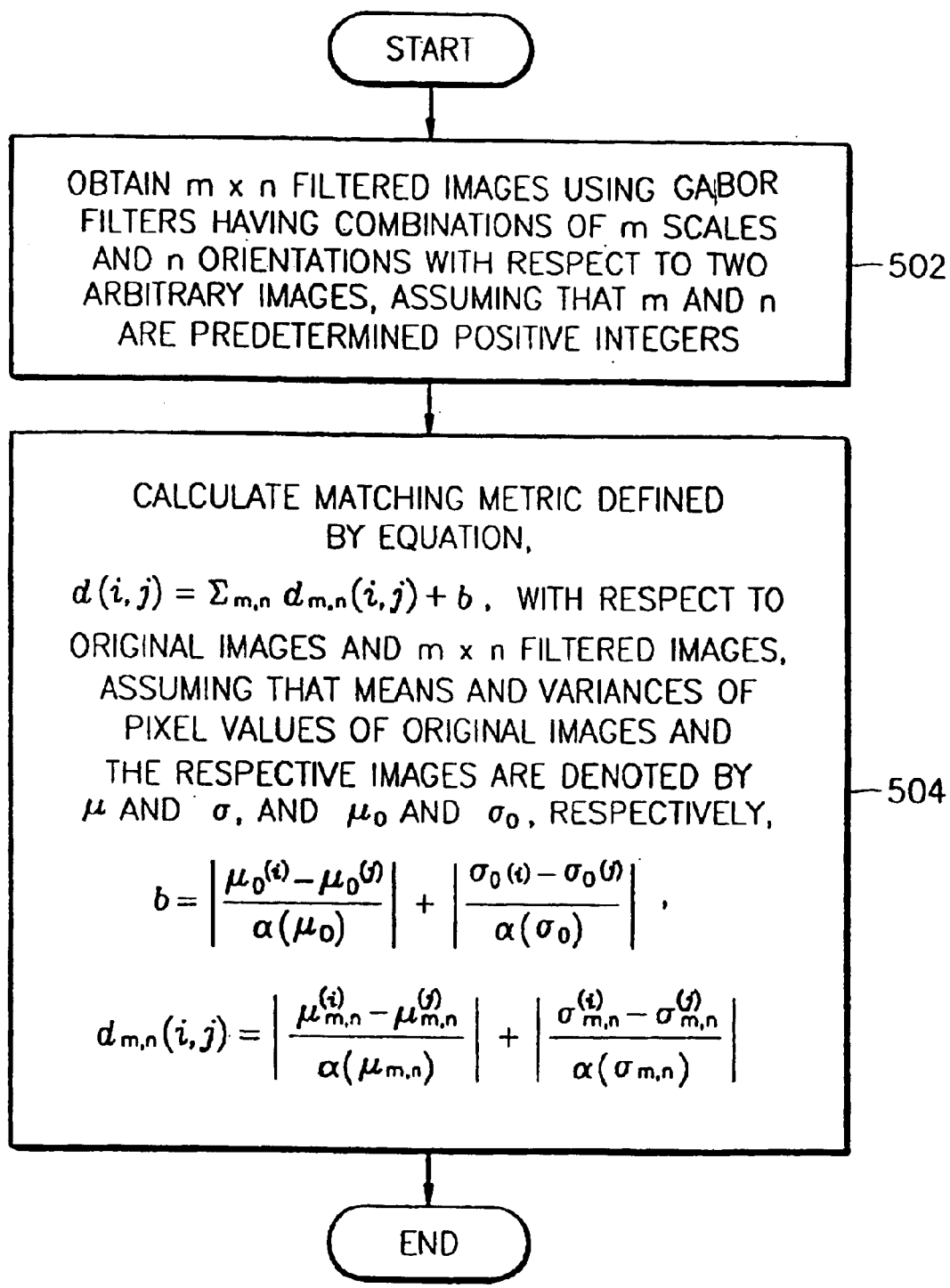
FIGS. 5 through 7 are flow charts illustrating major steps of a digital image texture analyzing method according to another embodiments of the present invention performed by the apparatus shown in FIG. 4.

FIG. 4 is a block diagram of a digital image texture analyzing apparatus according to another embodiment of the present invention, and FIG. 5 is a flow chart illustrating major steps of a digital image texture analyzing method according to another embodiment of the present invention. FIG. 5 will be occasionally referred to below.

Referring to FIG. 4, the digital image texture analyzing apparatus according to another embodiment of the present invention includes a filtering unit 402 and a matching metric calculating unit 404.

The operation of the digital image texture analyzing apparatus will now be described.

The filtering unit 402 obtains m×n filtered images with respect to two arbitrary images using Gabor filters, each having a unique combination of one of m scales and one of n orientations (m and n are predetermined positive integers) (step 502).

The matching metric calculating unit 404 calculates the matching metric defined by:

$$d(i, j) = \sum_{m,n} d_{m,n}(i, j) + b$$

with respect to the original image and the m×n filtered images, where the mean and variance of the pixel values of the respective images are $\mu$ and $\sigma$, the mean and variance of the pixel values of the original image are $\mu_0$ and $\sigma_0$, the mean and variance of the pixel values of the original image are $\mu_0$ and $\sigma_0$.

$$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|, \text{ and}$$

$$d_{m,n}(i,j) = \left| \frac{\mu_{m,n}^{(i)} - \mu_{m,n}^{(j)}j}{\alpha(\mu_{m,n})} \right| + \left| \frac{\sigma_{m,n}^{(i)} - \sigma_{m,n}^{(j)}}{\alpha(\sigma_{m,n})} \right|$$

(step 504). Here, $\alpha(\ )$ denotes a scaling function for normalizing individual feature components. Thus, $\alpha(\mu_{m,n})$ and $\alpha(\sigma_{m,n})$ are scaled mean and variance of the respective feature components of the descriptors over an entire database. The calculated matching metric indicates a difference between texture features of the two images. In other words, if the value of the calculated matching metric is smaller, the textures of the two images are determined to be similar to each other.

According to the above-described digital image texture analyzing method, the similarity between two arbitrary digital images can be determined by obtaining the matching metric between two images. Also, the digital image texture analyzing method can be applied to search for an image using the texture features of the image.

Figure 6:
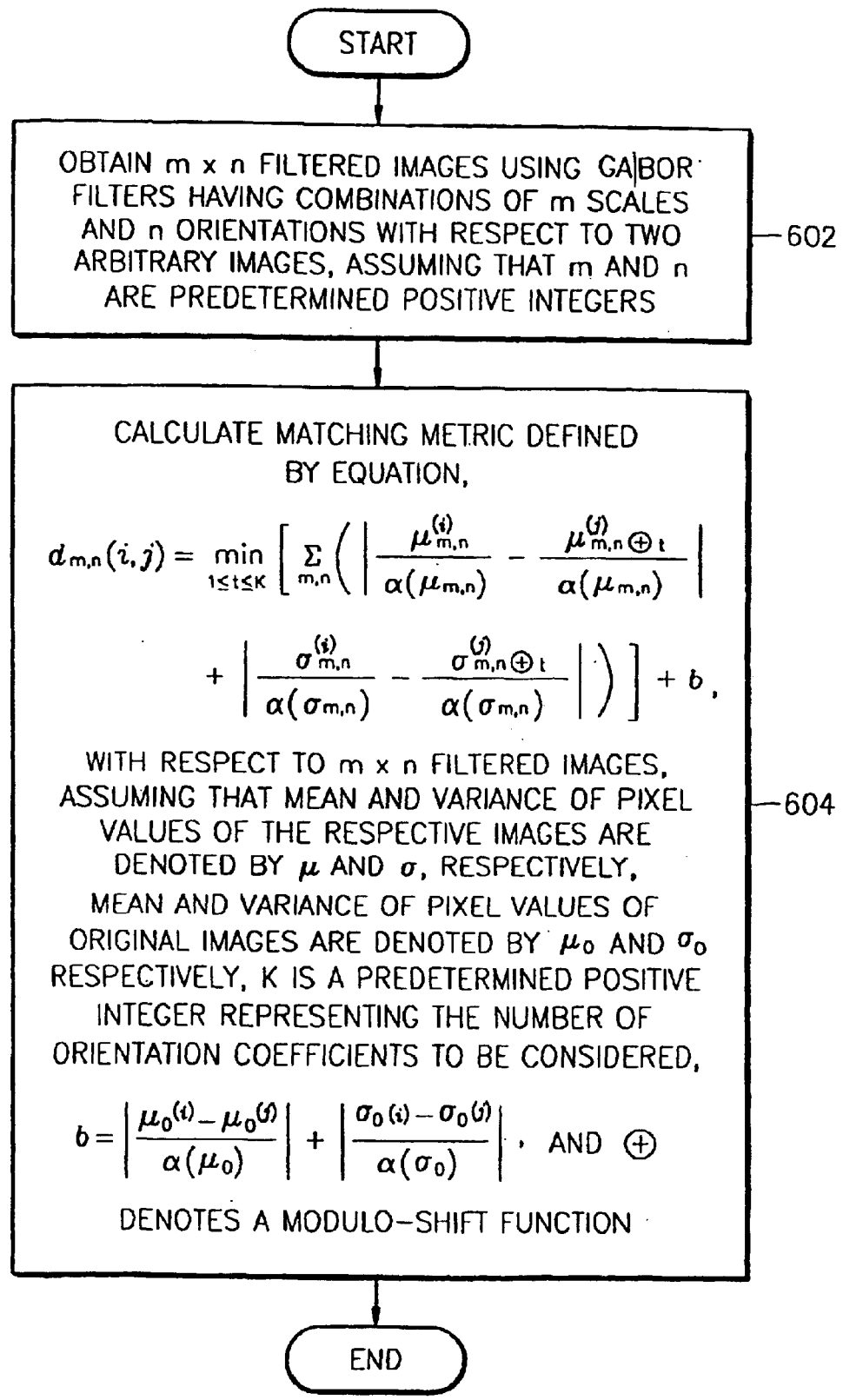

FIG. 6 is a flow chart illustrating major steps of a digital image texture analyzing method according to another embodiments of the present invention performed by the apparatus shown in FIG. 4.

In this embodiment, the filtering unit 402 obtains m×n filtered images with respect to two arbitrary images by filtering the original image using predetermined filters, leach having a unique combination of one of m scales and one of n orientations (m and n are predetermined positive integers) (step 602).

Next, the matching metric calculating unit 404 calculates the matching metric defined by:

$$d_{m,n}(i,j) = \min_{l \leq i \leq K} \left[ \sum_{m,n} \left( \left| \frac{\mu_{m,n}^{(i)}}{\alpha(\mu_{m,n})} - \frac{\mu_{m,n \oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n \oplus i}^{(j)}}{\alpha(\sigma_{m,n})} \right| \right) \right] + b$$

with respect to the m×n filtered images, where the mean and variance of the pixel values of the respective images are $\mu$ and $\sigma$, the mean and variance of the pixel values of the original image are $\mu_0$, and $\sigma_0$, K is a predetermined positive integer representing the number of orientations to be considered, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

$\oplus$ denotes a modulo shift function, and $\alpha(\ )$ is a predetermined scaling function (step 604). The calculated matching metric indicates a difference between texture features of the two images. In other words, if the value of the calculated matching metric is smaller, the textures of the two images are determined to be similar to each other. In particular, only when the texture features of two images are similar and one image is rotated relative to the other image, the thus-calculated matching metric allows accurate analysis, that is, it is determined that the two images have similar texture features. In other words, even when one image is just rotated relative to the other image, it is determined that the texture features of the two images are similar to each other, unlike in the conventional analyzing method. According to the above-described digital image texture analyzing method, the similarity between two arbitrary digital images can be determined by obtaining the matching metric between two images. Also, the digital image texture analyzing method can be applied to search for an image using the texture features of the image.

In the above-described embodiment, it has been described that the matching metric is obtained by calculating the sum of absolute differences in the mean of the pixel values and the sum of absolute differences between the variances of the pixel values, and calculating the minimum value of an added value of the calculated sums, with respect to an arbitrary filtered image and images filtered by Gabor filters having orientation coefficients different from those of filters used for filtering the arbitrary image.

However, the matching metric can also be obtained by calculating the minimum value of the sum of absolute differences in the mean of the pixel values with respect to an arbitrary filtered image and images filtered by Garbor filters having orientation coefficients different from those of filters used for filtering the arbitrary image. Alternatively, the matching metric can also be obtained by calculating the minimum value of the sum of absolute differences between the variances of the pixel values with respect to an arbitrary filtered image and images filtered by Garbor filters having orientation coefficients different from those of filters used for filtering the arbitrary image.

Figure 7:
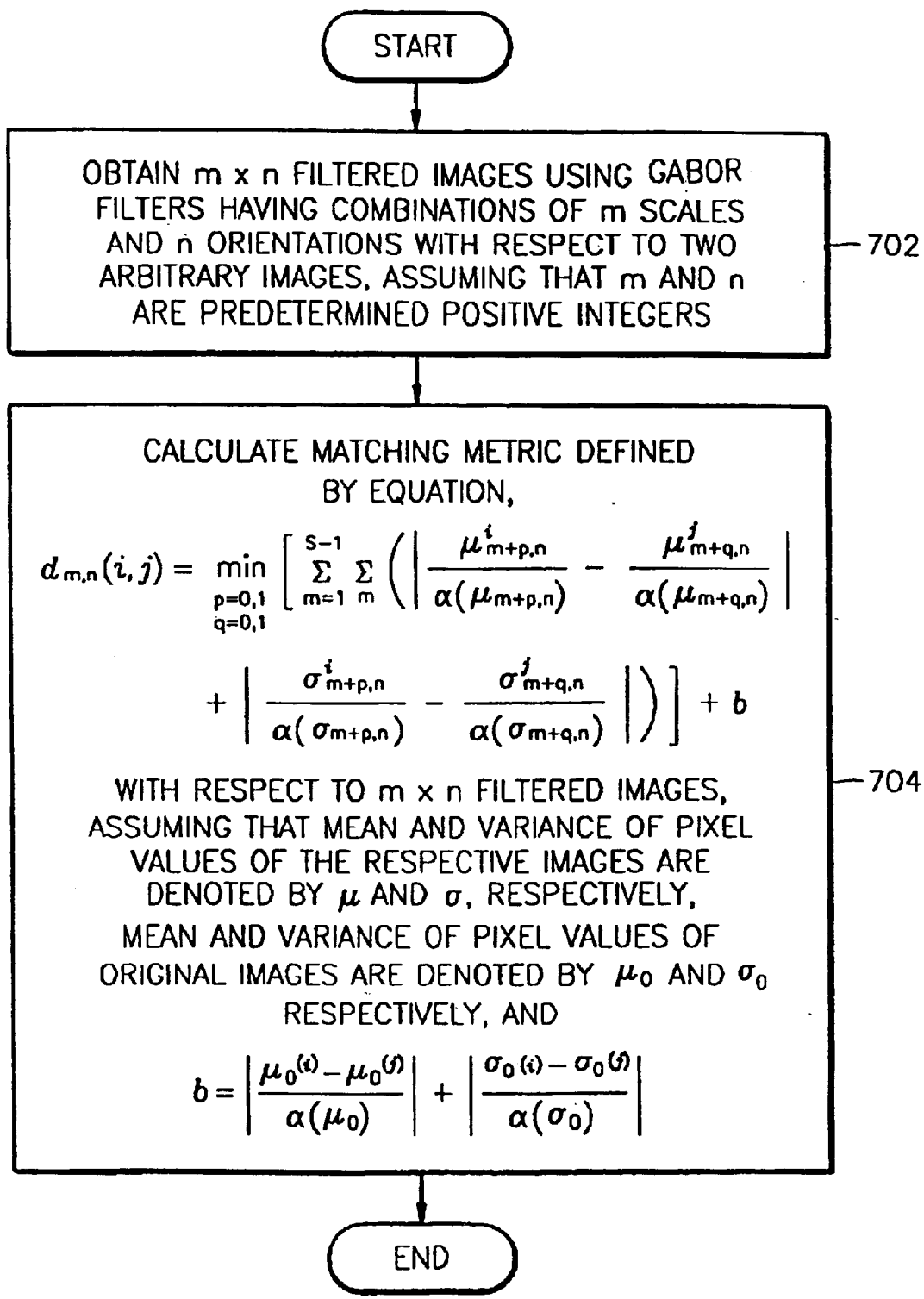

FIG. 7 is a flow chart illustrating major steps of a digital image texture analyzing method according to another embodiments of the present invention performed by the apparatus shown in FIG. 4.

In this embodiment, the filtering unit 402 obtains m×n filtered images with respect to two arbitrary images using Garbor filters, each having a unique combination of one of m scales and one of n orientations (m and n are positive integers) (step 702).

Next, the matching metric calculating unit 404 calculates the matching metric defined by:

$$d(i,j) = \min_{q=0,1}^{p=0,1}$$

$$\left[ \sum_{m}^{S-1} \sum_{n} \left| \frac{\mu_{m+p,n}^{i}}{\alpha(\mu_{m+p,n})} - \frac{\mu_{m+q,n}^{j}}{\alpha(\mu_{m+q,n})} \right| + \left| \frac{\sigma_{m+p,n}^{i}}{\alpha(\sigma_{m+p,n})} - \frac{\sigma_{m+q,n}^{j}}{\alpha(\sigma_{m+q,n})} \right| \right] + b$$

with respect to the original image and the m×n filtered images, where the mean and variance of the pixel values of the respective images are $\mu$ and $\sigma$, the mean and variance of the pixel values of the original image are $\mu_0$ and $\sigma_0$, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

S is a predetermined positive integer representing the number of scale coefficients to be considered, and $\alpha(\ )$ is a predetermined scaling function (step 704). The calculated matching metric indicates a difference between texture features of the two images. In other words, if the value of the calculated matching metric is smaller, the textures of the two images are determined to be similar to each other. In particular, only when the texture features of two images are similar and one image is enlarged or reduced relative to the other image, the thus-calculated matching metric allows accurate analysis, that is, it is determined that the two images have similar texture features. In other words, even when one image is just enlarged or reduced relative to the other image, it is determined that the texture features of the two images are similar to each other, unlike in the conventional analyzing method. According to the above-described digital image texture analyzing method, the similarity between two arbitrary digital images can be determined by obtaining the matching metric between two digital images. Also, the digital image texture analyzing method can be applied to search for an image using the texture features of the image.

In the above-described embodiment, it has been described that the matching metric is obtained by calculating the sum of absolute differences in the mean of the pixel values and the sum of absolute differences between the variances of the pixel values, and calculating the minimum value of an added value of the calculated sums, with respect to an arbitrary filtered image and images filtered by Garbor filters having scale coefficients different from those of filters used for filtering the arbitrary image.

The matching metric can also be obtained by calculating the minimum value of the sum of absolute differences in the mean of the pixel values with respect to an arbitrary filtered image and images filtered by Garbor filters having scale coefficients different from those of filters used for filtering the arbitrary image. Alternatively, the matching metric can also be obtained by calculating the minimum value of the sum of absolute differences between the variances of the pixel values with respect to an arbitrary filtered image and images filtered by Garbor filters having orientation coefficients different from those of filters used for filtering the arbitrary image.

The technologies applied to the embodiments described above with reference to FIGS. 6 and 7 can be used in appropriate combinations as understood by one skilled in the art. According to the digital image texture analyzing method of the at present invention, even when one image is rotated, enlarged or reduced relative to the other image, the two images can be accurately analyzed, that is, it is determined that they have similar texture features. The embodiments based on the combinations of the above-described embodiments shown in FIGS. 6 and 7 will not be described herein.

As described above, in the digital image texture analyzing method according to the present invention, the texture features of images can be analyzed or compared accurately. Also, according to the digital image texture analyzing method of the present invention, even when one image is rotated, enlarged or reduced relative to the other image, accurate analysis of the two images is allowed, that is, it is determined that they have similar texture features.

What is claimed is:

1. A digital image texture analyzing method comprising the steps of:
   (a) obtaining a mean ($\mu_0$) and a variance ($\sigma_0$) of pixel values of an original image;
   (b) obtaining m×n filtered images by filtering the original image using predetermined filters, each having a unique combination of one of m scales and one of n orientations, where m and n are predetermined positive integers;
   (c) calculating means ($\mu_{11}, \mu_{21}, \ldots, \mu_{mn}$) and variances ($\sigma_{11}, \sigma_{21}, \ldots, \sigma_{mn}$) of the respective filtered images; and
   (d) obtaining a texture descriptor having the mean ($\mu_0$) and a variance ($\sigma_0$) of the pixel values of the original image obtained in the step (a), and the means ($\mu_{11}, \mu_{21}, \ldots, \mu_{mn}$) and variances ($\sigma_{11}, \sigma_{21}, \ldots, \sigma_{mn}$) of the respective filtered images obtained in the step (c), as texture features.

2. The method according to claim 1, wherein the predetermined filters are Gabor filters.

3. A computer-readable recording medium for storing program codes for performing a digital image texture analyzing method comprising the steps of:
   (a) obtaining a mean ($\mu_0$) and a variance ($\sigma_0$) of the pixel values of an original image;
   (b) obtaining m×n filtered images by filtering the original image using predetermined filters, each having a unique combination of one of m scales and one of n orientations, where m and n are predetermined positive integers;
   (c) calculating means ($\mu_{11}, \mu_{21}, \ldots, \mu_{mn}$) and variances ($\sigma_{11}, \sigma_{21}, \ldots, \sigma_{mn}$) of the respective filtered images; and
   (d) obtaining a texture descriptor having the mean ($\mu_0$) and a variance ($\sigma_0$) of the pixel values of the original image obtained in the step (a), and the means ($\mu_{11}, \mu_{21}, \ldots, \mu_{mn}$) and variances ($\sigma_{11}, \sigma_{21}, \ldots, \sigma_{mn}$) of the respective filtered images, obtained in the step (c), as texture features.

4. The recording medium according to claim 3, wherein the predetermined filters are Gabor filters.

5. A digital image texture analyzing apparatus comprising:
   a mean/variance calculating unit which calculates a mean and a variance of pixel values of an original image;
   a texture descriptor setting unit which sets the mean and the variance as texture descriptors; and
   a filtering unit which filters the original image using predetermined filters, each having a unique combination of one of m scales and one of n orientations, where m and n are predetermined positive integers, to obtain m×n filtered images,
   wherein the mean/variance calculating unit obtains the mean ($\mu_0$) and a variance ($\sigma_0$) of the pixel values of the original image and the means ($\mu_{11}0, \mu_{21}0, \ldots, \mu_{mn}0$) and variances ($\sigma_{11}0, \sigma_{21}0, \ldots, \sigma_{mn}0$) of the respective filtered images, and
   wherein the texture descriptor setting unit obtains a texture descriptor having the mean ($\mu_0$) and a variance ($\sigma_0$) of the pixel values of the original image, and the means ($\mu_{11}, \mu_{21}, \ldots, \mu_{mn}$) and variances ($\sigma_{11}, \sigma^{21}, \ldots, \sigma_{mn}$) of the respective filtered images, as texture features.

6. A digital image texture analyzing method for evaluating a similarity of textures of two arbitrary digital images by obtaining a matching metric between the two arbitrary images, the method comprising calculating a matching metric including absolute differences between means of pixel values of the two arbitrary digital images.

7. The method according to claim 6, wherein the matching metric further includes absolute differences between variances of the pixel values of the original image.

8. A digital image texture analyzing method for evaluating a similarity of textures of two arbitrary digital images by obtaining a matching metric between the two arbitrary images, the method comprising calculating a matching metric including absolute differences between variances of pixel values of the two arbitrary digital images.

9. A digital image texture analyzing method for evaluating a similarity of textures of two arbitrary digital images by obtaining a matching metric between the two arbitrary images, the method comprising the steps of:
   (a) obtaining m×n filtered images with respect to the two arbitrary images using predetermined filters, each having a unique combination of one of m scales and one of n orientations, where m and n are predetermined positive integers; and (b) calculating the matching metric defined by:

$$d(i, j) = \sum_{m,n} d_{m,n}(i, j) + b$$

with respect to an original image and the m×n filtered images, where a mean and a variance of pixel values of the respective filtered images are $\mu$ and $\sigma$, a mean and a variance of pixel values of the original image are $\mu_0$ and $\sigma_0$, $$b = \left|\frac{\mu_0^{(i)} - \mu_0^{(j)}}{\alpha(\mu_0)}\right| + \left|\frac{\sigma_0^{(i)} - \sigma_0^{(j)}}{\alpha(\sigma_0)}\right|,$$

$$d_{m,n}(i, j) = \left|\frac{\mu_{m,n}^{(i)} - \mu_{m,n}^{(j)} j}{\alpha(\mu_{m,n})}\right| + \left|\frac{\sigma_{m,n}^{(i)} - \sigma_{m,n}^{(j)}}{\alpha(\sigma_{m,n})}\right|,$$

and $\alpha(\ )$ is a
predetermined scaling function.

10. The method according to claim 9, wherein the predetermined filters are Gabor filters.

11. A computer-readable recording medium for storing program codes for performing a digital image texture analyzing method for evaluating a similarity of textures of two arbitrary digital images by obtaining a matching metric between the two arbitrary images, the method comprising the steps of:

(a) obtaining m×n filtered images with respect to the two arbitrary images using predetermined filters, each having a unique combination of one of m scales and one of n orientations, where m and n are predetermined positive integers; and (b) calculating the matching metric defined by:

$$d(i, j) = \sum_{m,n} d_{m,n}(i, j) + b$$

with respect to an original image and the m×n filtered images, where a mean and a variance of pixel values of the respective filtered images are $\mu$ and $\sigma$, a mean and a variance of pixel values of the original image are $\mu_0$ and $\sigma_0$.

$$b = \left|\frac{\mu_0^{(i)} - \mu_0^{(j)}}{\alpha(\mu_0)}\right| + \left|\frac{\sigma_0^{(i)} - \sigma_0^{(j)}}{\alpha(\sigma_0)}\right|,$$

$$d_{m,n}(i, j) = \left|\frac{\mu_{m,n}^{(i)} - \mu_{m,n}^{(j)} j}{\alpha(\mu_{m,n})}\right| + \left|\frac{\sigma_{m,n}^{(i)} - \sigma_{m,n}^{j}}{\alpha(\sigma_{m,n})}\right|,$$

and $\alpha(\ )$ is a
predetermined scaling function.

12. The recording medium according to claim 11, wherein the predetermined filters are Gabor filters.

13. A digital image texture analyzing apparatus for evaluating a similarity of textures of two arbitrary digital images by obtaining a matching metric between the two arbitrary images, the apparatus comprising:

(a) a filtering unit which obtains m×n filtered images with respect to the two arbitrary images using predetermined filters, each having a unique combination of one of m scales and one of n orientations, where m and n are predetermined positive integers; and (b) a matching metric calculating unit which calculates the matching metric defined by:

$$d(i, j) = \sum_{m,n} d_{m,n}(i, j) + b$$

with respect to an original image and the m×n filtered images, where a mean and a variance of pixel values of the respective filtered images are $\mu$ and $\sigma$, a mean and a variance of pixel values of the original image are $\mu_0$ and $\sigma_0$, $$b = \left|\frac{\mu_0^{(i)} - \mu_0^{(j)}}{\alpha(\mu_0)}\right| + \left|\frac{\sigma_0^{(i)} - \sigma_0^{(j)}}{\alpha(\sigma_0)}\right|,$$

$$d_{m,n}(i, j) = \left|\frac{\mu_{m,n}^{(i)} - \mu_{m,n}^{(j)} j}{\alpha(\mu_{m,n})}\right| + \left|\frac{\sigma_{m,n}^{(i)} - \sigma_{m,n}^{j}}{\alpha(\sigma_{m,n})}\right|,$$

and $\alpha(\ )$ is a
predetermined scaling function.

14. The apparatus according to claim 13, wherein the predetermined filters are Gabor filters.

15. A digital image texture analyzing method for evaluating a similarity of textures of two arbitrary digital images by obtaining a matching metric between the two arbitrary images, the method comprising the steps of:

(a) obtaining filtered images using predetermined filters having different orientation coefficients with respect to the two arbitrary images; and (b) obtaining a matching metric by calculating a minimum value of a sum of absolute differences between means of pixel values with respect to an arbitrary filtered image and images filtered by filters having orientation coefficients different from those of filters used for filtering the arbitrary image.

16. The method according to claim 15, wherein the predetermined filters are Gabor filters.

17. A digital image texture analyzing method for evaluating a similarity of textures of two arbitrary digital images by obtaining a matching metric between the two arbitrary images, the method comprising the steps of:

(a) obtaining filtered images using predetermined filters having different orientation coefficients with respect to the two arbitrary images; and (b) obtaining a matching metric by calculating a minimum value of a sum of absolute differences between variances of pixel values with respect to an arbitrary filtered image and images filtered by filters having orientation coefficients different from those of filters used for filtering the arbitrary image.

18. The method according to claim 17, wherein the predetermined filters are Gabor filters.

19. The method according to claim 17, wherein the step (b) includes the step of obtaining a matching metric by calculating the minimum value of an added value of the sums of absolute differences between the means and the variance of the pixel values with respect to the arbitrary filtered image and the images filtered by the filters having orientation coefficients different from those of the filters used for filtering the arbitrary image.

20. The method according to claim 17, wherein the step (a) includes the step of (a') obtaining m×n filtered images with respect to the two arbitrary images by filtering an original image using predetermined filters, each having a unique combination of one of m scales and one of n orientations, where m and n are predetermined positive integers; and wherein the step (b) includes the step of (b') calculating the matching metric defined by:

$$d_{m,n}(i, j) = \min_{l \leq i \leq K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right]$$

with respect to the m×n filtered images, where a mean and a variance of pixel values of the respective images are $\mu$ and $\sigma$, K is a predetermined positive integer representing a number of orientations to be considered, $\oplus$ denotes a modulo shift function, and $\alpha( \ )$ is a predetermined scaling function.

21. The method according to claim 20, wherein the step of (b') calculating the matching metric further defined by:

$$d_{m,n}(i, j) =$$
$$\min_{l \leq i \leq K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right] + b$$

with respect to the m×n filtered images, where the mean and the variance of the pixel values of the respective images are $\mu$ and $\sigma$, a mean and a variance of pixel values of the original image are $\mu_0$ and $\sigma_0$, K is the predetermined positive integer representing the number of orientations to be considered, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

$\oplus$ denotes the modulo shift function, and $\alpha( \ )$ is the predetermined scaling function.

22. A computer-readable recording medium for storing program codes for performing a digital image texture analyzing method for evaluating a similarity of textures of two arbitrary digital images by obtaining a matching metric between the two arbitrary images, the method comprising the steps of:

(a) obtaining m×n filtered images with respect to the two arbitrary images using predetermined filters, each having a unique combination of one of m scales and one of n orientations, where m and n are predetermined positive integers; and (b) calculating the matching metric defined by:

$$d_{m,n}(i, j) = \min_{l \leq i \leq K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right]$$

with respect to the m×n filtered images, where a mean and a variance of the pixel values of the respective images are $\mu$ and $\sigma$, K is a predetermined positive integer representing a number of orientations to be considered, $\oplus$ denotes a modulo shift function, and $\alpha( \ )$ is a predetermined scaling function.

23. The computer-readable recording medium according to claim 22, wherein the step of (b') calculating the matching metric further defined by:

$$d_{m,n}(i, j) =$$
$$\min_{l \leq i \leq K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right] + b$$

with respect to the m×n filtered images, where the mean and the variance of the pixel values of the respective images are $\mu$ and $\sigma$, a mean and a variance of pixel values of the original image are and $\mu_0$ and $\sigma_0$, K is the predetermined positive integer representing the number of orientations to be considered, $\oplus$ denotes the modulo shift function, and $\alpha( \ )$ is the predetermined scaling function.

24. A digital image texture analyzing apparatus for evaluating a similarity of textures of two arbitrary digital images by obtaining a matching metric between the two arbitrary digital images, the apparatus comprising:

a filtering unit which obtains m×n filtered images with respect to the two arbitrary images by filtering an original image using predetermined filters, each having a unique combination of one of m scales and one of n orientations, where m and n are predetermined positive integers; and a matching metric calculating unit which calculates the matching metric defined by:

$$d_{m,n}(i, j) =$$
$$\min_{l \leq i \leq K} \left[ \sum_{m,n} \left( \left| \frac{\mu_{m,n}^{(i)}}{\alpha(\mu_{m,n})} - \frac{\mu_{m,n\oplus i}^{(j)}}{\alpha(\mu_{m,n})} \right| \right) + \left( \left| \frac{\sigma_{m,n}^{(i)}}{\alpha(\sigma_{m,n})} - \frac{\sigma_{m,n\oplus i}^{(j)}}{\alpha(\sigma_{m,n})} \right| \right) \right] + b$$

with respect to the m×n filtered images, where a mean and a variance of pixel values of the respective filtered images are $\mu$ and $\sigma$, a mean and a variance of pixel values of the original image are $\mu_0$ and $\sigma_0$, K is a predetermined positive integer representing the number of orientations to be considered, $\oplus$ denotes the modulo shift function, and $\alpha( \ )$ is the predetermined scaling function.

25. A digital image texture analyzing method for evaluating a similarity of textures of two arbitrary digital images by obtaining a matching metric between the two arbitrary images, the method comprising the steps of:

(a) obtaining filtered images using predetermined filters having different scale coefficients with respect to the two arbitrary images; and (b) obtaining a matching metric by calculating a minimum value of a sum of absolute differences between means of pixel values with respect to an arbitrary filtered image and images filtered by filters having scale coefficients different from those of filters used for filtering the arbitrary image.

26. The method according to claim 25, wherein the predetermined filters are Gabor filters.

27. A digital image texture analyzing method for evaluating a similarity of textures of two arbitrary digital images by obtaining a matching metric between the two arbitrary images, the method comprising the steps of:

(a) obtaining filtered images using predetermined filters having different scale coefficients with respect to the two arbitrary images; and (b) obtaining a matching metric by calculating a minimum value of a sum of absolute differences between variances of pixel values with respect to an arbitrary filtered image and images filtered by filters having scale coefficients different from those of filters used for filtering the arbitrary image.

28. The method according to claim 27, wherein the predetermined filters are Gabor filters.

29. The method according to claim 27, wherein the step (b) includes the step of (b') obtaining a matching metric by calculating the minimum value of an added value of the sums of absolute differences between the means and a variance of the pixel values with respect to an arbitrary filtered image and images filtered by filters having scale filters different from those of filters used for filtering the arbitrary image.

30. The method according to claim 27, wherein the step (a) includes the step of (a') obtaining m×n filtered images with respect to the two arbitrary images by filtering an original image using predetermined filters, each having a unique combination of one of m scales and one of n orientations, where m and n are predetermined positive integers; and wherein the step (b) includes the step of (b') calculating the matching metric defined by:

$$d(i, j) = \min_{\substack{p=0,1 \\ q=0,1}} \left[ \sum_{m}^{S-1} \sum_{n} \left| \frac{\mu^i_{m+p,n}}{\alpha(\mu_{m+p,n})} - \frac{\mu^j_{m+q,n}}{\alpha(\mu_{m+q,n})} \right| + \left| \frac{\sigma^i_{m+p,n}}{\alpha(\sigma_{m+p,n})} - \frac{\sigma^j_{m+q,n}}{\alpha(\sigma_{m+q,n})} \right| \right]$$

with respect to the original image and the m×n filtered images, where a mean and a variance of pixel values of the respective images are $\mu$ and $\sigma$, S is a predetermined positive integer representing a number of scale coefficients to be considered, and $\alpha(\ )$ is a predetermined scaling function.

31. The method according to claim 30, wherein the step (b') includes the step of calculating the matching metric defined by:

$$d(i, j) = \min_{\substack{p=0,1 \\ q=0,1}} \left[ \sum_{m}^{S-1} \sum_{n} \left| \frac{\mu^i_{m+p,n}}{\alpha(\mu_{m+p,n})} - \frac{\mu^j_{m+q,n}}{\alpha(\mu_{m+q,n})} \right| + \left| \frac{\sigma^i_{m+p,n}}{\alpha(\sigma_{m+p,n})} - \frac{\sigma^j_{m+q,n}}{\alpha(\sigma_{m+q,n})} \right| \right] + b$$

with respect to the original image and the m×n filtered images, where the mean and the variance of the pixel values of the respective images are $\mu$ and $\sigma$, a mean and a variance of pixel values of the original image are $\mu_0$ and $\sigma_0$, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

S is the predetermined positive integer representing the number of scale coefficients to be considered, and $\alpha(\ )$ is the predetermined scaling function.

32. A computer-readable recording medium for storing program codes for performing a digital image texture analyzing method for evaluating a similarity of textures of two arbitrary digital images by obtaining a matching metric between the two arbitrary images, the method comprising the steps of:

(a) obtaining m×n filtered images with respect to the two arbitrary images by filtering an original image using predetermined filters, each having a unique combination of one of m scales and one of n orientations, where m and n are predetermined positive integers; and (b) calculating the matching metric defined by:

$$d(i, j) = \min_{\substack{p=0,1 \\ q=0,1}} \left[ \sum_{m}^{S-1} \sum_{n} \left| \frac{\mu^i_{m+p,n}}{\alpha(\mu_{m+p,n})} - \frac{\mu^j_{m+q,n}}{\alpha(\mu_{m+q,n})} \right| + \left| \frac{\sigma^i_{m+p,n}}{\alpha(\sigma_{m+p,n})} - \frac{\sigma^j_{m+q,n}}{\alpha(\sigma_{m+q,n})} \right| \right]$$

with respect to the original image and the m×n filtered images, where a mean and a variance of pixel values of the respective images are $\mu$ and $\sigma$, S is a predetermined positive integer representing a number of scale coefficients to be considered, and $\alpha(\ )$ is a predetermined scaling function.

33. The computer-readable recording medium according to claim 32, wherein the step (b) includes the step of calculating the matching metric defined by:

$$d(i, j) = \min_{\substack{p=0,1 \\ q=0,1}} \left[ \sum_{m}^{S-1} \sum_{n} \left| \frac{\mu^i_{m+p,n}}{\alpha(\mu_{m+p,n})} - \frac{\mu^j_{m+q,n}}{\alpha(\mu_{m+q,n})} \right| + \left| \frac{\sigma^i_{m+p,n}}{\alpha(\sigma_{m+p,n})} - \frac{\sigma^j_{m+q,n}}{\alpha(\sigma_{m+q,n})} \right| \right] + b$$

with respect to the original image and the m×n filtered images, where the mean and the variance of the pixel values of the respective images are $\mu$ and $\sigma$, a mean and a variance of pixel values of the original image are $\mu_0$ and $\sigma_0$, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

S is the predetermined positive integer representing the number of scale coefficients to be considered, and $\alpha(\ )$ is the predetermined scaling function.

34. A digital image texture analyzing apparatus for evaluating a similarity of textures of two arbitrary digital images by obtaining a matching metric between the two arbitrary images, the apparatus comprising:

a filtering unit which obtains m×n filtered images with respect to the two arbitrary images by filtering an original image using predetermined filters, each having a unique combination of one of m scales and one of n orientations, where m and n are predetermined positive integers; and a matching metric calculating unit which calculates the matching metric defined by:

$$d(i, j) = \min_{\substack{p=0,1 \\ q=0,1}} \left[ \sum_{m}^{S-1} \sum_{n} \left| \frac{\mu^i_{m+p,n}}{\alpha(\mu_{m+p,n})} - \frac{\mu^j_{m+q,n}}{\alpha(\mu_{m+q,n})} \right| + \left| \frac{\sigma^i_{m+p,n}}{\alpha(\sigma_{m+p,n})} - \frac{\sigma^j_{m+q,n}}{\alpha(\sigma_{m+q,n})} \right| \right]$$

with respect to the original image and the m×n filtered images, where a mean and a variance of pixel values of the respective images are $\mu$ and $\sigma$, S is a predetermined positive integer representing a number of scale coefficients to be considered, and $\alpha(\ )$ is a predetermined scaling function.

35. The apparatus according to claim 34, wherein the predetermined filters are Gabor filters.

36. The apparatus according to claim 34, wherein the matching metric calculating unit calculates the matching metric defined by:

$$d(i,j) = \min_{\substack{p=0,1 \\ q=0,1}} \left[ \sum_{m}^{S-1} \sum_{n} \left| \frac{\mu_{m+p,n}^{i}}{\alpha(\mu_{m+p,n})} - \frac{\mu_{m+q,n}^{j}}{\alpha(\mu_{m+q,n})} \right| + \left| \frac{\sigma_{m+p,n}^{i}}{\alpha(\sigma_{m+p,n})} - \frac{\sigma_{m+q,n}^{j}}{\alpha(\sigma_{m+q,n})} \right| \right] + b$$

with respect to the original image and the m×n filtered images, where the mean and the variance of the pixel values of the respective images are $\mu$ and $\sigma$, a mean and a variance of pixel values of the original image are $\mu_0$ and $\sigma_0$, $$b = \left| \frac{\mu_0^{(i)} - \mu_0^{(j)}}{\alpha(\mu_0)} \right| + \left| \frac{\sigma_0^{(i)} - \sigma_0^{(j)}}{\alpha(\sigma_0)} \right|,$$

S is the predetermined positive integer representing the number of scale coefficients to be considered, and $\alpha(\ )$ is the predetermined scaling function.

37. A digital image texture analyzing method for evaluating a similarity of textures of two arbitrary digital images by obtaining a matching metric between the two arbitrary images, the method comprising the steps of:

(a) obtaining filtered images using predetermined filters having different orientation and scale coefficients with respect to the two arbitrary images; and (b) obtaining a matching metric by calculating a minimum value of a sum of absolute differences between variances and means of pixel values with respect with respect to an arbitrary filtered image and images filtered by filters having scale and orientation coefficients different from those of filters used for filtering the arbitrary image.

* * * * *